T. VAN ALLER.
SOLDERING IRON.
APPLICATION FILED JULY 17, 1908.
973,592.
Patented Oct. 25, 1910.
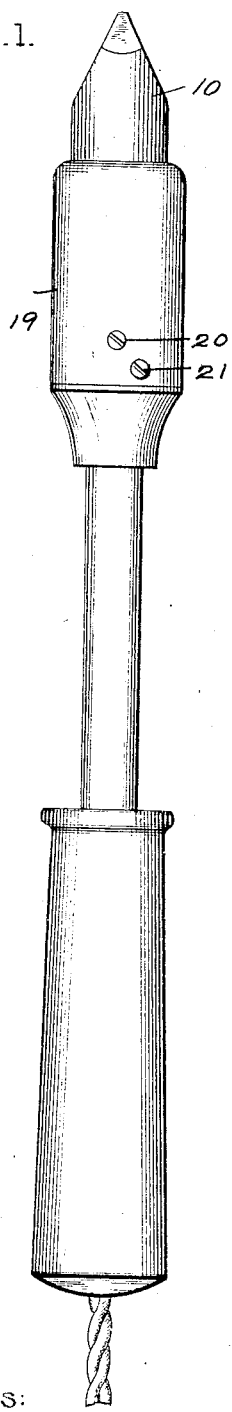
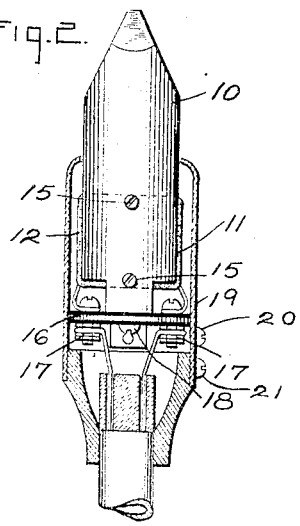
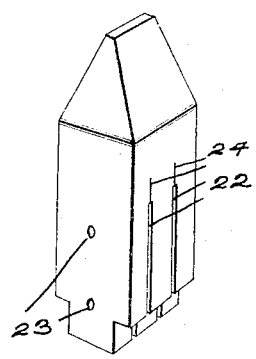
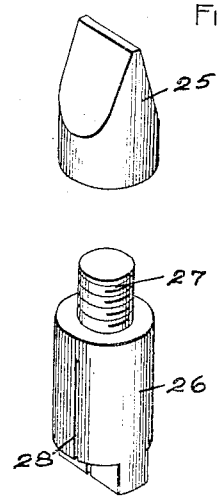
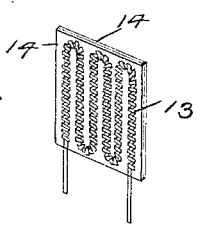
Witnesses:
W. Ray Taylor.
J. Ellis Elen.
Inventor
Tycho Van Aller,
by Albert G. Davis
Att'y.

UNITED STATES PATENT OFFICE.

TYCHO VAN ALLER, OF SCHENECTADY, NEW YORK, ASSIGNOR TO GENERAL ELECTRIC COMPANY, A CORPORATION OF NEW YORK.

SOLDERING-IRON.

973,592.  Specification of Letters Patent.  Patented Oct. 25, 1910.

Application filed July 17, 1908. Serial No. 444,001.

*To all whom it may concern:*

Be it known that I, TYCHO VAN ALLER, a citizen of the United States, residing at Schenectady, county of Schenectady, State of New York, have invented certain new and useful Improvements in Soldering-Irons, of which the following is a specification.

This invention relates to electrically-heated tools, and has for its object the provision of a device of this character, which is extremely simple in construction, and which can be brought up to a working temperature rapidly and efficiently.

My invention relates more specifically to such tools as soldering irons in which an end or point of metal is brought up to a temperature sufficient to melt solder.

One of the objects of my invention is to construct a soldering iron in which the heating unit is arranged very near the working surface of the iron and in intimate thermal relation with the metal.

Other objects of my invention will appear in the course of the following specification in which I have shown my invention embodied in concrete form for purposes of illustration.

In the drawing, Figure 1 represents an elevation of my soldering iron complete; Fig. 2 is a sectional view of the working end of the iron; Fig. 3 is a perspective view of another form; Fig. 4 is a similar view of another modification; and Fig. 5 is a perspective view of the heating unit.

Referring to the drawing, 10 represents a soldering tip, which is merely a body of metal having good heat-conductive qualities and to which solder will adhere. The metal commonly used for this purpose is copper although any other suitable metal may be used which comes within the scope of my invention. This tip 10, which is commonly a copper tip, is provided with a slot 11 across its diameter adapted to receive the heating unit 12. This heating unit is of the flat type and may be of the form shown in my previous application, Serial No. 443,145, filed July 11, 1908. The essential characteristic of this unit is that it is in intimate thermal relation with the iron throughout the length of the conductor. This unit consists of a flattened conductor 13 which is laid in the slot between the two layers of mica 14. In order to secure the unit in place and press the metal into mechanical contact with the unit, I provide screws 15 which pass through the unit, and as the slot affords a certain amount of resiliency the sides of the slot may be pressed together. The copper is mounted upon an insulated metallic disk 16 through which the terminals 17 pass to the handle. The copper is secured to the disk by means of the screws 18 and the disk is secured to the casing 19, which surrounds the unit, by means of the screws 20. The casing is in turn secured to the body of the iron by screws 21.

In Fig. 3 I have shown another form adapted for a larger iron. In this form slots 22 are provided with the unit within them which may be held in place and the metal pressed together by a fastening passing through the perforation 23. In order to give more spring to the metal in the slot and enable the metal to be pressed into thermal contact with the unit, I extend the slot at 24. This extension is not necessarily as wide as the main portion of the slot as shown in Fig. 2.

In Fig. 4 another form is shown in which the soldering tip of copper 25 is separable from the heating body 26 and is secured thereto by screw threads 27. This heating body is provided with a slot 28, and is not essentially different from the other form except as to the removable tip. In this case the body may be of inoxidizable metal which has good heat-conductive properties to which solder does not necessarily adhere. In this way the soldering tip may be renewed at a very small expense.

While I have shown my invention embodied in concrete form for purposes of illustration, it should be understood that I do not limit my invention thereto except in so far as it is limited by the scope of the claims annexed hereto.

What I claim as new and desire to secure by Letters Patent of the United States, is,—

1. An electric heating device comprising a slotted metallic body, a resistance conductor formed into a flat heating unit within said slot and means for pressing the surface of the slot into intimate thermal relation with the conductor throughout its length.

2. An electric heating device comprising a slotted metallic body, a flat heating unit within said slot, and means for pressing the metal into intimate thermal relation with the unit.

3. An electric heating device comprising a metallic body provided with a plurality of slots, flat heating units within said slots and means for pressing the surface of the slot into intimate thermal relation with the conductor throughout its length.

4. An electric heating device comprising a metallic body provided with a plurality of slots, flat heating units within said slots, and means for pressing the metal into intimate thermal relation with the units.

5. An electric heating device comprising a metallic body, and a resistance conductor forming a flat heating unit within said body and means for pressing the surface of the slots into intimate thermal relation with both sides of the conductor throughout its length.

6. An electric soldering iron comprising a metallic head having a soldering point at one end and a slot at the other, and a flat heating unit within said slot and in intimate thermal relation with the head throughout the area of the unit.

In witness whereof, I have hereunto set my hand this 16th day of July, 1908.

TYCHO VAN ALLER.

Witnesses:
HELEN ORFORD,
BENJAMIN B. HULL.